Jan. 28, 1930.  H. L. MASON  1,745,307
VEHICLE SIGNAL AND RELEASE SYSTEM
Filed Jan. 19, 1928  2 Sheets-Sheet 1
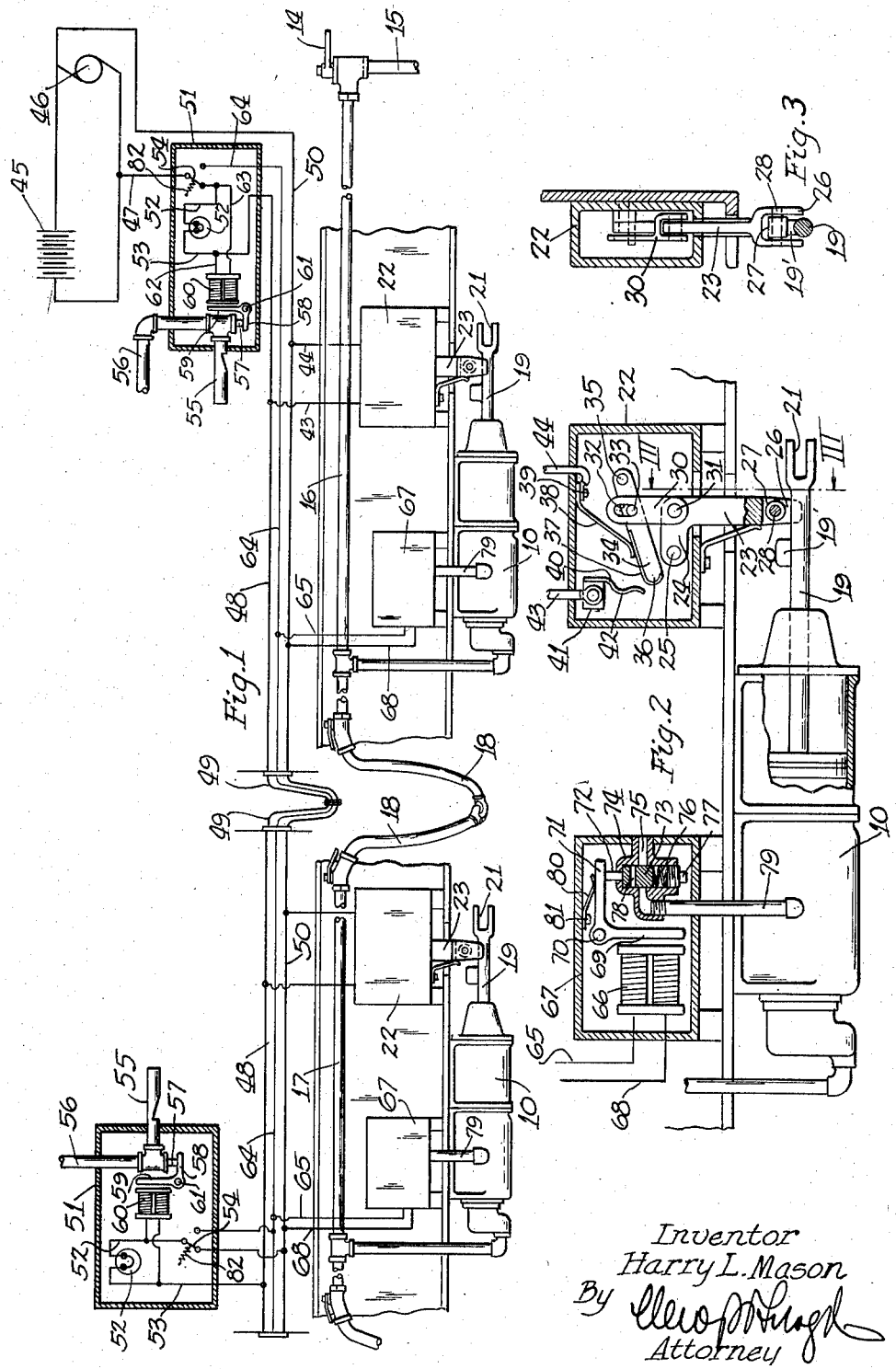
Inventor
Harry L. Mason
By
Attorney Jan. 28, 1930.    H. L. MASON    1,745,307
VEHICLE SIGNAL AND RELEASE SYSTEM
Filed Jan. 19, 1928    2 Sheets-Sheet 2

Inventor
Harry L. Mason
By
Attorney

Patented Jan. 28, 1930

1,745,307

UNITED STATES PATENT OFFICE

HARRY L. MASON, OF OTTUMWA, IOWA

VEHICLE SIGNAL AND RELEASE SYSTEM

Application filed January 19, 1928. Serial No. 247,928.

This invention relates to signal systems and more particularly to automatic brake signals, although features thereof may be employed with equal advantage for other purposes.

It contemplates more especially the provision of automatically operable signals rendered responsive to a prime mover to indicate the functioning thereof.

Railroad cars are usually operated in trains constituting a series of interconnected units which are controlled by air brakes individual to each car or unit. The control therefor is remote, it being usually situated in the engine cab within ready access of the engineer. Defects in the brakes or air system will cause the brakes to stick, since the remote release thereof is ineffective on those brakes having defects therein or in the air line proximate thereto.

In view thereof, the train may proceed with certain of the brakes applied which doubtless consumes much pulling energy, causes rough riding, and impairs the mechanical equipment. Such a condition often exists without the knowledge of the engineer or the crew; therefore much injury results prior to the discovery thereof.

One object of the present invention is to provide a signal system automatically responsive to a prime mover to indicate the functioning thereof.

Another object is the provision of a signal system in association with a train of cars to indicate the braking thereof.

Still another object is the provision of means individual to each car of a train to remotely signal the braking thereof.

A further object is the provision of an electrically responsive signal system operatively connected to vehicle braking means to insure the release thereof.

A still further object is the adaptation of a signal system to a train of vehicles to insure the proper functioning of the braking mechanism thereof.

Still a further object is the provision of a central signal station for receiving responses from local stations as to the functions of the prime movers operatively connected thereto.

Other objects and advantages will appear from the following description of an illustrated embodiment thereof.

In the drawings:

Figure 1 is a conventional disclosed braking system embodying features of the present invention.

Figure 2 is a sectional view in elevation of a switch and release mechanism employed in connection with the system to energize the signals and release the vehicle brakes.

Figure 3 is a sectional view in elevation taken substantially along line III—III of Figure 2.

Figure 4:
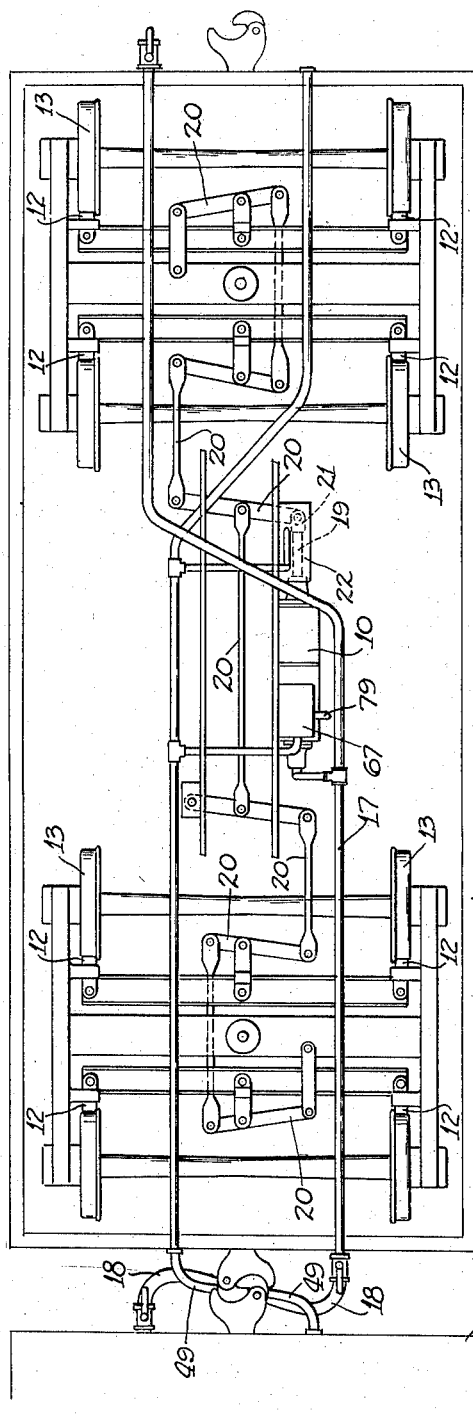
Figure 4 is a view of the underside of a series of cars having braking instrumentalities applied thereto.
Figure 5:
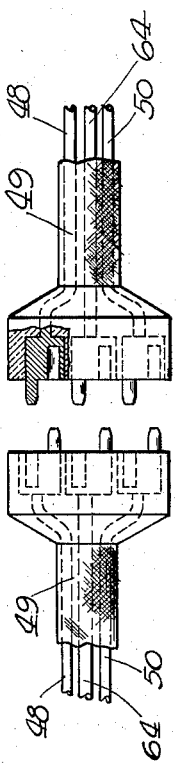
Figure 5 is an enlarged detailed view of an electrical coupler.

The system selected for illustration is shown in association with air brake actuating instrumentalities 10 individual to interconnected cars 11 constituting a train (Figure 4), they being supported thereon for effecting the application of brakes 12 to the wheels 13 which serve to locomote the cars 11. The brake valve control 14 which is usually positioned in the engineer's cab of a locomotive, admits air to the brake actuating housing 10 from a suitable source through the conduit 15.

The conduit 15 communicates with conduits 16 and 17 which lead to the housings 10 of the respective cars to which they are secured. Flexible couplings 18 are interposed between each of the cars to operatively connect the brake housings 10 of each car 11 with the air line which is controlled by the valve 14 to apply or release the brakes 12. The brakes 12 of the cars are operatively connected to piston rods 19 which are reciprocable within the housings 10, through suitable linkage 20 engaging the forked extremities 21 of the rods 19.

It is a common occurrence for the brakes 12 to stick and remain in their operative position on any one or more of the cars 11 so that the release of the valve 14 is of no consequence in withdrawing the applied brakes 12. Thus the engineer in the locomotive cab is often unaware thereof until serious injury has resulted. In view thereof, signal devices are provided, in this instance located in the locomotive cab and terminal car usually termed the caboose, where part of the crew are always present, to respond to the improper application of the brakes 12.

To this end, switch boxes 22 are fixed to each of the cars 11, there being a bell crank lever 23 projecting through the wall of each box for pivotal movement about an arm 24 carried by a pin 25.

The lever 23 has a forked extremity 26 which confines a roller 27 therebetween for rotary movement on a pin 28 bridging the furcations 26, thereby establishing a reaction with the piston rod 19 to swing the lever 23 about its pivot 25 a short arc in a counterclockwise direction in respect to Figure 2, the movement of lever 23 being due to the impinging of a lug 19′ on brake rod upon the roller bearing at the end of said lever 23. This movement occurs when the chamber 10 is charged with air for the application of the brakes. A link 30 is pivoted to the bell crank lever 23 about a pin 31 positioned at the juncture of the lever arms, the link 30 having a slot 32 provided in the free extremity thereof to slidably engage a pin 33 carried by a lever 34. The lever 34 is pivoted about a pin 35 secured to the switch box 22 so that the free extremity 36 thereof will be elevated owing to the clockwise movement of the lever 34 when the chamber 10 is freed of air and plunger 19 returns to its normal inoperative position.

The extremity 36 of the lever 34 is provided with a conductor plate 37 secured thereto for constant contact with a resilient terminal 38 which is secured to the switch box 22 by a standard fastener 39. Another resilient terminal 40 is fixed to the box 22 as at 41. The terminal 40 is provided with an arcuate depression 42 in the path of the conductor plate 37 fixed to the lever extremity 36 to coact therewith when the brake rod 19 having a lug 19′ engages the roller 27 to effect clockwise movement and consequent elevation of the lever extremity 36, thereby closing the electrical circuit through leads 43 and 44 connected electrically with a battery circuit.

The battery circuit to be hereinafter traced in detail comprises a battery 45 having a generator 46 shunted with respect thereto to maintain the battery charged, the generator constituting standard equipment of a train. A wire 47 connects one terminal of the battery with the terminal 43 of the signal energizing switches 22 on each car 11, these being operatively connected together by wires 48 which are coupled to each other through a flexible coupling conduit 49 carried intermediate each car 11. The terminal 44 connects with a wire 50 which closes the circuit to the battery 45 and generator 46 to impress a potential therebetween during the application of the brakes 12.

Signal instrumentalities, in this instance audible and visual indicators are connected across the terminals 43 and 44. The signal instrumentalities comprise, in this instance, a container 51 having a visual indicator such as an incandescent lamp 52 mounted therein. The lamp 52 is interposed between the wires 47 and 48 for electrical connection in series therewith owing to the connectors 52 and 53 contacting with wires 47 and 48, respectively. A switch 54 is confined in the signal container 51 to effect the release of the brakes 12 should the air release valve 14 be ineffective for that purpose, switch 54 closes the circuit to an electromagnet 66 which by moving an armature 69 opens an auxiliary valve 73 to chamber 10, later to be described in detail, whereby air will escape therefrom if the regular air valve does not work properly. An audible signal such as a whistle 55 is in communication with a subsidiary air line 56 which is controlled by a valve 57 operatively connected with a bell crank lever 58 having an arm 59 thereof serving as an armature for an electro-magnet 60. As shown, the lever 58 is pivoted about a pin 61 at the juncture of its arms to actuate the whistle 55 simultaneously with the visual incandescence of the lamp 52, since the electromagnet 60 is shunted with the lamp 52 by means of the wires 62 and 63.

Signal instrumentalities 51 are provided in the locomotive cab and terminal car of the train, so that the engineer and members of the train crew will be advised of the application of the brakes on any car during the traverse of the train under power. Needless to say the engineer will release air valve 14 prior to proceeding, but this does not insure the removal of the brake shoes 12 from the wheels 13. To this end, an auxiliary electrical brake release is provided in the signal casings 51 within range of the engineer and members of the crew. The electrical release consists of the switch 54 normally closing the circuit between the signals 52—55 and the terminals 43—44 which are in the battery circuit to energize the signals responsive to the application of the brakes 12.

A third wire 64 completes the system, and extends from car to car of the train together with wires 48 and 50 connected therebetween by the flexible coupling 49 having a similar number, in this instance three, of contacts to extend the circuit between the cars 11. The wire 64 terminates in each of the signal housings 51, and leads 65 branch from said wire to connect one terminal of an electromagnet 66 positioned in a brake release housing 67 (Figure 2). Another lead 68 branches from the wire 50, and electrically connects the other terminal of the electromagnet 66 which controls an armature 69 pivoted within each of the release housings 67 about a pin 70, there being a release mechanism confined in housings 67 individual to each car 11 or braking mechanism 10.

The armature 69 has an arm 71 thereof in the path of a rod 72 which is secured to a plunger 73 reciprocably mounted in a valve body 74 fixed within the housing 67. The valve body 74 communicates with the atmosphere through a passage 75 provided therein, this passage 75 being normally closed by the plunger 73 which is maintained in the path thereof by a spring 76. A threaded plug 77 urges the spring 76 against the plunger 73 which has a port 78 extending diametrically therethrough. It is to be noted that the passage 75 terminates in a conduit 79 which communicates with the interior of the brake housing 10 for releasing the air pressure therein under predetermined conditions to be hereinafter described.

A leaf spring 80 is fixed at one extremity 81 thereof to the housing 67 so that its free extremity will normally urge the arm 71 of the relay armature 69 in contact with the plunger rod 72. The brakes 12 having been applied to the wheels 13 to stop the train, signals 52 and 55 will impart visual and audible signals respectively. In proceeding again, the engineer releases the brakes by manipulating valve 14, but for some unknown reason the brakes may stick on one or more of the cars 11. The train proceeds, and the signals 52 and 55 remain energized owing to the sticking of certain of the brakes 12.

The engineer or members of the crew, will then shift the switch 54 contained in either of the signal housings 51, so as to contact with the circuit wire 64, thereby causing the battery 45 to energize the electromagnetic relays 66 which draw their respective armatures 69 into contact therewith. The armatures 69 will thereupon move in a clockwise direction (Figure 2) so that the arm 71 thereof will depress the plunger rod 72 against the action of the spring 76 until the plunger port 78 will communicate with the passage 75 in the valve body 74, thereby effecting communication between the atmosphere and the interior of the brake housing 10 to relieve the air pressure therein. The brakes 12 will then return to their inoperative position, and the switch 54 may be turned to its normal position to close the signal circuit which will be ready for another similar emergency. A spring 82 is preferably employed to normally retain the switches 54 in the signal circuit, so that the brake release is effected by transferring the switches 54 against the urge of the spring.

It will be apparent from the above discussion that automatic signal means are provided to announce and indicate the position of the brakes during the operation of the vehicle, it being obvious that any suitable signal means may be employed as indicators, and that the audible or visual signal or both may be substituted or modified to meet the dictates of technical practice.

Various changes may be made in the embodiment of the invention herein specifically described without departing from or sacrificing any of the advantages thereof as defined in the appended claims.

I claim:

1. In a device of the character described, the combination with a compression brake having means for normally effecting the operation and the release thereof, of signal means energized responsive to the operation of said brake, and ancillary means for releasing said brake, said signal means being effective to indicate whether said ancillary means has released said brake.

2. In a device of the character described the combination with a compression brake having means for effecting its operation and release, of signal means energized responsive to the operation of said brake, and separate means manually operative for releasing said brake, said signal means being simultaneously deenergized upon the operation of said separate brake release means to release said brake.

3. In a device of the character described, the combination with a compression brake having means for effecting its operation and release, of signal means energized responsive to the operation of said brake, and separate means manually operative for releasing said brake, the effective operation of either of said release means de-energizing said signal means, said signal means including both audible and visible signals operable so long as said brakes are in effective position.

4. The combination with a vehicle, of mechanical braking means therefor, mechanical means for controlling the operation thereof, signal means for automatically indicating the position of said braking means, and means in said signal means independent of said mechanical control means to release said braking means, the release of said brakes de-energizing said signal means.

5. The combination with a vehicle, of mechanical braking means therefor, mechanical means for controlling the operation thereof, a signal system for indicating the position of said braking means and adapted to be deenergized upon the release of said braking means, and means constituting a part of said signal system to release the braking means independently of said controlling means.

6. The combination with a vehicle, of braking means therefor, means for normally controlling the operation of said braking means, an electrical circuit, signal means and ancillary brake release means in said electrical circuit, and means operatively connected to said braking means to render said signals responsive to the position of said braking means.

7. The combination with a vehicle, of braking means therefor, means for controlling the operation of said braking means, an electrical circuit, signal means in said electrical circuit, means operatively connected to said braking means to render said signals responsive to the position of said braking means, and means in said electrical circuit to alter the position of said braking means.

8. The combination with a vehicle, of braking means therefor, means for controlling the operation of said braking means, an electrical circuit, signal means in said electrical circuit, means operatively connected to said braking means to render said signals responsive to the position of said braking means, and means in said electrical circuit to alter the position of said braking means and simultaneously brake the signal circuit.

9. The combination with interconnected vehicles constituting a train, braking means for said vehicles, a master control for said braking means, a primary electrical circuit associated with each vehicle, couplers between each vehicle to close said primary circuit, signal means in said primary circuit, circuits local to each vehicle for effecting an operative connection between said braking means and the signal responsive thereto, and means in said primary circuit for closing said local circuits to insure release of the braking means on said vehicles during the traverse thereof.

10. The combination with interconnected vehicles constituting a train, braking means for said vehicles, a master control for said braking means, a primary electrical circuit associated with each vehicle, couplers between each vehicle to close said primary circuit, signal means in said primary circuit, circuits local to each vehicle for effecting an operative connection between said braking means and the signal responsive thereto, means in said primary circuit for closing said local circuits to insure release of the braking means on said vehicles during the traverse thereof, and means for returning said release means to close said primary circuit after releasing said braking means.

11. The combination with a series of interconnected wheeled cars constituting a train, of pneumatically operated brakes for each car, a master pneumatic control for said brakes, a primary electric circuit, couplers between each car to connect the primary circuit, a prime mover on each car to actuate said brakes responsive to the manipulation of said master control, local circuits individual to each, prime mover connected to said primary circuit, signal means in said primary circuit, means responsive to said prime movers to energize said signals, and means selectively operable to de-energize said primary circuit and energize local circuits to release said brakes.

HARRY L. MASON.